(12) United States Patent
Luo et al.

(10) Patent No.: US 9,499,749 B2
(45) Date of Patent: Nov. 22, 2016

(54) REMOVING UNSTABLE SULFUR COMPOUNDS FROM CRUDE OIL

(71) Applicant: Chevron U.S.A. Inc., San Ramon, CA (US)

(72) Inventors: Huping Luo, Richmond, CA (US); Zhen Zhou, Emeryville, CA (US); Lin Li, Albany, CA (US); Alice He, San Rafael, CA (US); Daniel Chinn, Bay Point, CA (US); Graham Forder, Novato, CA (US); Lyman Young, Richmond, CA (US); Shabbir Husain, San Pablo, CA (US); William Schinski, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/730,676

(22) Filed: Jun. 4, 2015

(65) Prior Publication Data

US 2015/0267126 A1    Sep. 24, 2015

Related U.S. Application Data

(62) Division of application No. 12/332,130, filed on Dec. 10, 2008, now Pat. No. 9,062,260.

(51) Int. Cl.
*C10G 29/00* (2006.01)
*B01J 29/14* (2006.01)
(Continued)

(52) U.S. Cl.
CPC .................. *C10G 29/00* (2013.01); *B01J 8/00* (2013.01); *B01J 19/24* (2013.01); *B01J 29/146* (2013.01); *C10G 17/00* (2013.01); *C10G 17/06* (2013.01); *C10G 21/06* (2013.01); *C10G 21/12* (2013.01); *C10G 21/16* (2013.01); *C10G 21/20* (2013.01); *C10G 29/04* (2013.01); *C10G 29/20* (2013.01); *C10G 45/02* (2013.01); *B01J 27/16* (2013.01);
(Continued)

(58) Field of Classification Search
CPC ...... C10G 29/00; C10G 29/12; C10G 29/20; C10G 29/22; C10G 31/06; B01J 19/24; B01J 8/00
USPC ....... 208/224, 208, 219, 223, 238, 240, 241, 208/244, 245, 247
See application file for complete search history.

(56) References Cited

U.S. PATENT DOCUMENTS 3,496,097 A    2/1970   Engle
3,816,301 A    6/1974   Sorgenti
(Continued)

FOREIGN PATENT DOCUMENTS

| AU | 4498972 | 1/1974 |
| JP | 4952803 | 5/1974 |
| WO | 9748639 | 12/1997 |

OTHER PUBLICATIONS

PCT International Search Report and Written Opinion for PCT/US2009/067251 dated Jul. 9, 2010, 7 pages.

*Primary Examiner* — Sharon Pregler
(74) *Attorney, Agent, or Firm* — Susan M. Abernathy; Parul P. Anderson

(57) ABSTRACT

A crude oil which contains at least 0.1 wt % unstable sulfur compounds is treated in a reaction zone at low temperature to convert at least 50 wt % of the unstable sulfur compounds contained therein. The reaction and removal of sulfur from the crude may be facilitated by contacting the crude oil with a catalytic material in the presence of a stripping fluid.

18 Claims, 2 Drawing Sheets

(51) Int. Cl.

| | | |
|---|---|---|
| *C10G 17/00* | (2006.01) | |
| *C10G 17/06* | (2006.01) | |
| *C10G 21/06* | (2006.01) | |
| *C10G 21/12* | (2006.01) | |
| *C10G 21/16* | (2006.01) | |
| *C10G 21/20* | (2006.01) | |
| *C10G 29/04* | (2006.01) | |
| *C10G 45/02* | (2006.01) | |
| *B01J 8/00* | (2006.01) | |
| *B01J 19/24* | (2006.01) | |
| *C10G 29/20* | (2006.01) | |
| *B01J 27/16* | (2006.01) | |
| *B01J 29/08* | (2006.01) | |

(52) U.S. Cl.
CPC ..... *B01J 29/084* (2013.01); *B01J 2208/00796* (2013.01); *B01J 2219/24* (2013.01); *C10G 2300/1033* (2013.01); *C10G 2300/202* (2013.01); *C10G 2300/4006* (2013.01); *C10G 2300/4093* (2013.01)

(56) References Cited

U.S. PATENT DOCUMENTS

| | | | |
|---|---|---|---|
| 3,873,442 A * | 3/1975 | Yarrington | C10G 45/08 208/112 |
| 4,498,972 A | 2/1985 | Toulhoat et al. | |
| 4,500,424 A | 2/1985 | Simpson et al. | |
| 4,566,965 A | 1/1986 | Olmstead | |
| 4,775,462 A | 10/1988 | Imai et al. | |
| 4,937,218 A | 6/1990 | Ramirez et al. | |
| 5,266,285 A | 11/1993 | Glancy et al. | |
| 5,552,036 A | 9/1996 | Foret et al. | |
| 5,695,632 A | 12/1997 | Brons et al. | |
| 5,851,381 A | 12/1998 | Tanaka et al. | |
| 5,902,554 A | 5/1999 | Kirkbride | |
| 5,919,354 A | 7/1999 | Bartek | |
| 5,935,421 A | 8/1999 | Brons et al. | |
| 6,160,193 A | 12/2000 | Gore | |
| 6,207,041 B1 | 3/2001 | Morel et al. | |
| 6,342,152 B1 | 1/2002 | Yoshita | |
| 6,444,117 B1 * | 9/2002 | Khan | C10G 31/06 208/189 |
| 6,579,444 B2 | 6/2003 | Feimer et al. | |
| 6,841,062 B2 * | 1/2005 | Reynolds | 208/89 |
| 2002/0008049 A1 | 1/2002 | Inomata et al. | |
| 2003/0000867 A1 | 1/2003 | Reynolds | |
| 2003/0051988 A1 | 3/2003 | Gunnerman et al. | |
| 2003/0116473 A1 | 6/2003 | Koide et al. | |
| 2004/0065618 A1 | 4/2004 | Ketley et al. | |
| 2004/0200759 A1 | 10/2004 | Cullen | |
| 2004/0222131 A1 | 11/2004 | Cullen | |
| 2006/0157339 A1 | 7/2006 | Cullen | |
| 2006/0175229 A1 | 8/2006 | Montanari et al. | |
| 2006/0231462 A1 | 10/2006 | Johnson | |
| 2006/0254956 A1 | 11/2006 | Khan | |
| 2006/0281637 A1 | 12/2006 | Zaid et al. | |
| 2007/0080098 A1 | 4/2007 | Zaid et al. | |
| 2007/0102323 A1 | 5/2007 | Lee et al. | |
| 2007/0138059 A1 | 6/2007 | Farshid et al. | |
| 2007/0175796 A1 | 8/2007 | Mock | |
| 2007/0209967 A1 | 9/2007 | Allinson et al. | |
| 2007/0283812 A1 | 12/2007 | Liu et al. | |
| 2008/0083537 A1 | 4/2008 | Klassen et al. | |
| 2008/0108518 A1 | 5/2008 | Clark et al. | |
| 2008/0173571 A1 | 7/2008 | Yen et al. | |
| 2008/0190852 A1 | 8/2008 | Farha | |
| 2008/0217008 A1 | 9/2008 | Langdon et al. | |

* cited by examiner

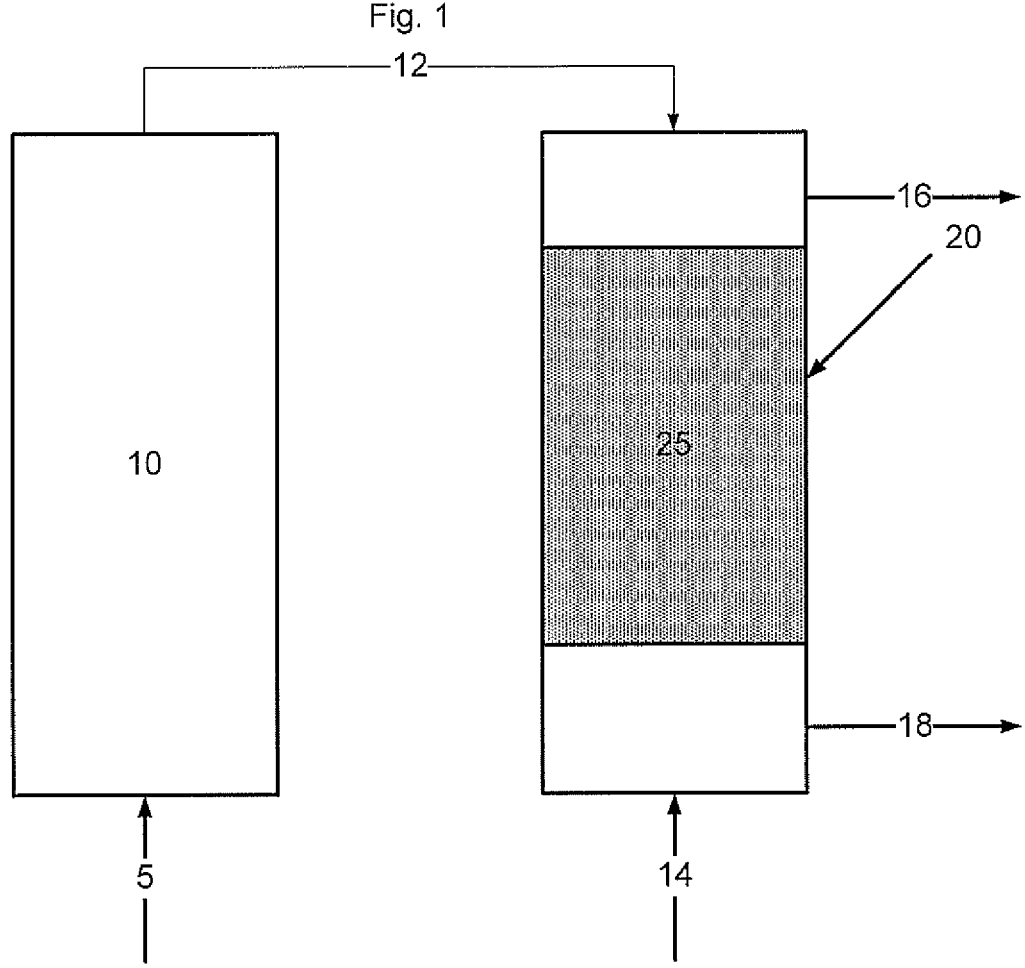

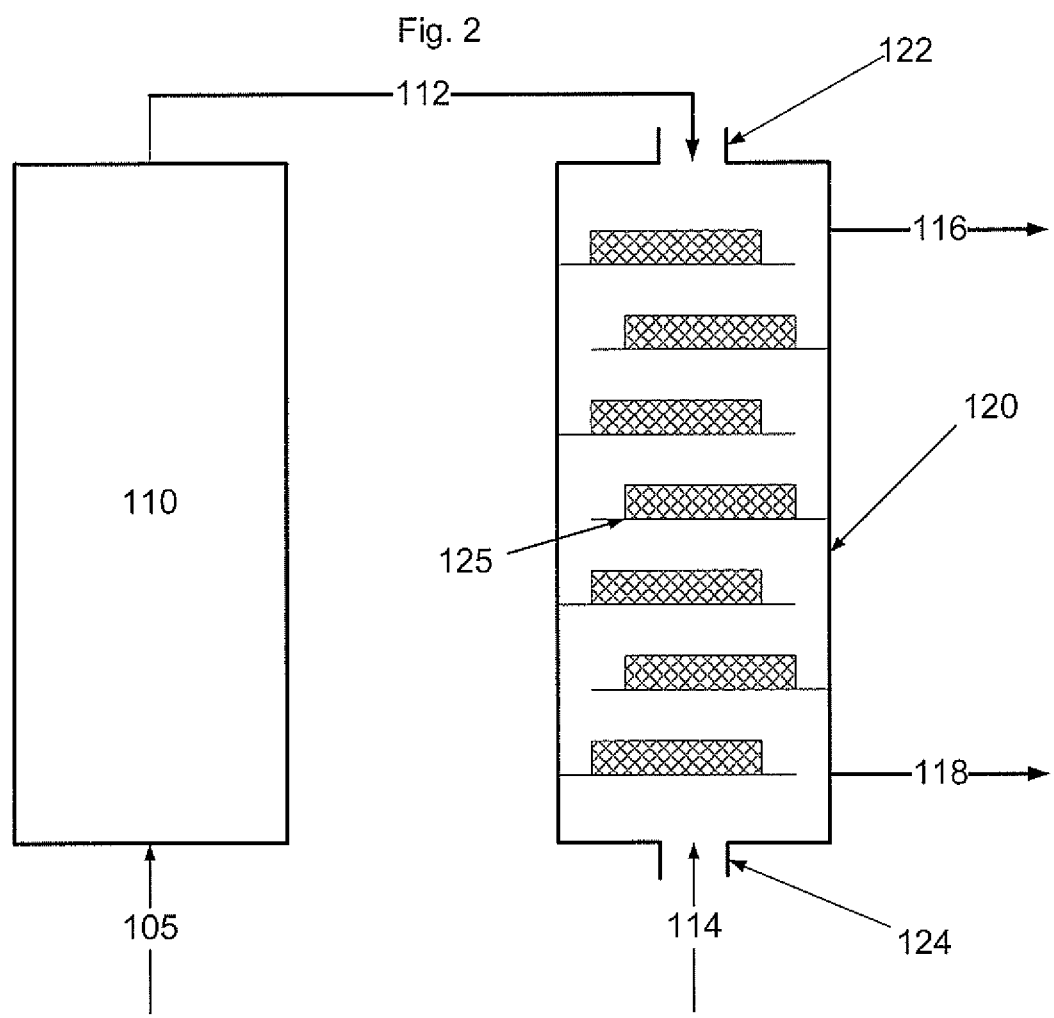

REMOVING UNSTABLE SULFUR COMPOUNDS FROM CRUDE OIL

CROSS-REFERENCE TO RELATED APPLICATION

This application is a divisional of and claims priority to U.S. patent application Ser. No. 12/332,130, titled "Removing Unstable Sulfur Compounds From Crude Oil," and filed on Dec. 10, 2008. The entire contents of the foregoing application is hereby incorporated herein by reference.

TECHNICAL FIELD

The present invention is directed to a method for purifying a crude oil in preparation for shipping, transporting or refining.

BACKGROUND

Sulfur-containing crude oils continue to be a challenge for the shipper and refiner. Sulfur compounds in crude may present hazards to those engaged in handling, transporting or shipping the crude. They may introduce corrosion issues for transportation vessels, storage vessels, reaction vessels, separation vessels, piping and pumps used in the transportation and handling of sulfur containing crudes. They may introduce unique challenges for distilling such sulfur-containing crude oils.

U.S. Pat. No. 6,841,062 describes a crude oil desulfurization process which comprises hydrodesulfurizing a crude oil feed in a crude desulfurization unit. As described, when the product sulfur is maintained at less than 1 wt % based on feed, and preferably less than 0.75 wt % based on feed, reaction conditions in the crude desulfurization unit include a reaction temperature between about 315° C. and 440° C. (600° F.-825° F.), pressures from 6.9 MPa to about 20.7 MPa (1000-3000 psi), and a feed rate (vol oil/vol cat hr) from 0.1 to about 20 $hr^{-1}$. Hydrogen circulation rate is general in the range from about 303 std liter $H_2$/kg oil to 758 std liters $H_2$/kg oil (2000-5000 standard cubic feet per barrel).

Some crude oils contain significant amount of unstable sulfur compounds. Under mild heating, these sulfur components react by hydrolysis and/or thermal degradation to form volatile sulfur compounds, including $H_2S$. These reactions usually result in a slow but continuous hydrogen sulfide generation during the transportation of those crudes, which is one of the major risks or hazards on transporting such crude oils. These reactions also cause difficulties in refining those crude oils. At high temperature, as in the atmospheric and the vacuum distillation towers, the $H_2S$ production rate in the overhead of a distillation tower may be high enough to cause upsets in the tower. Currently, there is no existing technology to remove or convert unstable sulfur compounds in the crude oils, and crude containing high unstable sulfur has to be blended with other crudes in refineries. Overall, the need for blending severely limits the refiner's capacity in processing these unstable sulfur containing crudes. As a result, such crudes are usually sold at a discount in the market. Thus, solving the $H_2S$ evolution problem could substantially improve both the marketability and the value of crudes such as Eocene.

SUMMARY

In embodiments, the present process is provided for removing sulfur compounds from crude oils, wherein the sulfur compounds are unstable at normal handling and processing conditions. Thus, the present invention provides a process for reducing the sulfur content of a crude oil, comprising heating a crude oil containing at least 0.1 wt % unstable sulfur compounds at conditions sufficient to remove at least 50% of the unstable sulfur compounds contained therein.

Thus, a desulfurized crude oil is prepared by heating a crude oil containing at least 0.1 wt % unstable sulfur compounds at a temperature in the range of 100° F. to 400° F. to convert at least 50% by weight of the unstable sulfur from the crude oil. In embodiments, the crude oil is heated at a temperature in the range of 100° F. to 450° F. and at a pressure in the range of 15 psia to 200 psia for a time period in the range of 1 minute to 60 minutes.

In some such embodiments, the heated crude oil is contacted with a catalytic material selected from the group consisting of inorganic or organic acids, particulate molecular sieves, dissolved metal ions, metal-containing slurry in an organic or aqueous fluid and a particulate catalyst comprising a metal component on an inorganic oxide matrix.

In another embodiment, the process for reducing the sulfur content of a crude oil comprises heating a crude oil containing at least 0.1 wt % unstable sulfur compounds at a temperature in the range of 350° F. to 600° F. to convert at least 50% of the unstable sulfur compounds contained therein.

In some such embodiments, the crude oil is heated in the absence of added catalytic material In some such embodiments, the process further comprises contacting the heated crude oil with a stripping fluid to facilitate the removal of volatile sulfur compounds contained in the heated crude oil.

BRIEF DESCRIPTION OF THE FIGURES

FIG. 1 and FIG. 2 illustrate two embodiments of the invention, showing the heating zone and the reaction zone for removing the unstable sulfur compounds from crude oil.

DETAILED DESCRIPTION

As used herein, unstable sulfur compounds are those compounds in crude oil which react, in the absence of added hydrogen and without an added catalytic material, when the crude oil is heated to elevated temperatures to form normally gaseous products. Hydrogen sulfide is one of the products generated from the reaction of the unstable sulfur compounds. However, sulfur-containing hydrocarbonaceous molecules may also be present in the gas phase effluent from the heated crude oil, either resulting from the reaction of unstable sulfur compounds, or by vaporization of volatile sulfur containing hydrocarbons. In embodiments, unstable sulfur compounds include sulfur compounds having the generic formula $S_x$, wherein x is >1 and S represents a sulfur atom. In embodiments, x is a value in the range from 1 to 10.

In embodiments, unstable sulfur compounds include polysulfides, which are a class of polymeric materials with the general formula for the repeat unit: —$[(CH_2)_m+S_x]_n$—, where m is the number of $CH_2$ repeating units, x is the number of sulfur atoms and n indicates the number of repeat units. In some such embodiments, x is a value in the range from 1 to 10, m is a value in the range of 1 to 10, and n is a value in the range of 1 to 20.

In their simplest form, inorganic polysulfides are ionic compounds with anions having the general formula $S_n^{2-}$. In some such embodiments, n is a value in the range of 1 to 10.

In embodiments, unstable sulfur compounds include polysulfanes, which are un-branched chains of sulfur atoms terminating with hydrogen and having the general formula $H_2S_x$, where $x>1$. In some such embodiments, x is a value in the range of 1 to 10.

The reaction of the unstable sulfur compounds involves conversion to volatile sulfur compounds at temperatures as low as 100° F. In embodiments, the volatile sulfur compounds include $H_2S$, low molecular weight mercaptans ($C_xH_{2x}S$, where $x \geq 1$), carbon disulfide ($CS_2$), carbonyl sulfide (OCS) and mixtures thereof.

The hydrocarbon streams which may be treated as disclosed herein may be crude oils, synthetic crude oils; atmospheric gas oils; fuel oils; diesel oils and the like and combinations thereof in various non-limiting mixtures. In embodiments, The hydrocarbon streams may contain other components including, but not necessarily limited to, water, $CO_2$, asphaltenes, acids, naphtha, paraffins, olefins, oxygenated hydrocarbons, oxygen, nitrogen, sulfur, sulfur derivatives, disulfides and aromatics, and the like and combinations thereof.

The process for removing unstable sulfur compounds from the crude takes place in a treatment zone comprising a heating step, a reaction step and a separation step. The steps may be performed simultaneously in a single vessel, sequentially in a single vessel or sequentially in separate vessels. Likewise, any two of the steps may be performed simultaneously in a single vessel, sequentially in a single vessel or sequentially in separate vessels, with the remaining step being performed in a separate vessel. In embodiments, the heating is said to take place in a heating zone, reactions are said to take place in a reaction zone and separations are said to occur in a separation zone. In all cases, the heating zone may involve the same volume or different volumes from the reaction zone and the reaction zone may involve the same volume or different volumes from the separation zone.

In the present invention, a crude oil containing at least 0.1 wt % unstable sulfur compounds is heated at conditions sufficient to convert at least a portion of the unstable sulfur compounds contained therein. In embodiments, the crude oil is heated at conditions sufficient to remove at least 50% of the unstable sulfur compounds contained therein. In some such embodiments, reaction conditions are sufficient to convert at least 75 wt %, or even 90 wt %, of the unstable sulfur compounds in the crude to volatile sulfur compounds.

Process conditions within the treatment zone are selected to achieve the desired removal of the unstable sulfur compounds. Thus, the crude oil is heated at a temperature within the range of 100° F. to 800° F. and at a pressure of 15 psia and above for a time period of up to 120 minutes for removing the unstable sulfur compounds. In embodiments, the crude oil is heated at a temperature in the range of 100° F. to 600° F. and at a pressure of 15 psia and above.

Relatively lower temperatures may be used when catalytic materials are employed to facilitate the reaction of unstable sulfur compounds. In some such embodiments, the crude oil is heated at a temperature in the range of 100° F. to 450° F. and at a pressure in the range of 15 psia to 200 psia for a time period in the range of 1 minute to 60 minutes. Other exemplary temperature ranges include a range of 100° F. to 350° F. Other exemplary residence time ranges include the range of 5 minutes to 50 minutes or the range of 10 minutes to 40 minutes. Other exemplary pressure ranges include the range of 15 psia to 150 psia. Reaction of the unstable sulfur compounds in the presence of a catalytic material in the temperature range of 450° F. to 800° F. will result in a rapid reaction rate. Such rapid reaction rates are generally not detrimental to the process for removing the unstable sulfur compounds; the high temperature reaction may be selected if the desulfurized crude oil is passed directly from the treatment zone to a distillation column.

While the temperature of the crude oil may vary to some extent as it passes through the treatment zone, the temperature during each step will be maintained within the specified range.

The unstable sulfur compounds may be removed in a thermal (non-catalytic) process. The unstable sulfur compounds may be satisfactorily converted at a temperature in the range of 100° F. to 450° F., though the reaction rate will be lower and the reaction time longer than in the catalytic case. Thus, in embodiments, at least 50% of the unstable sulfur compounds are converted when the crude oil is heated at a temperature in the range of 350° F. to 600° F. For example, the crude oil is heated at a temperature in the range of 350° F. to 600° F. and at a pressure in the range of 15 psia to 200 psia for a time period in the range of 1 minute to 60 minutes. Other exemplary temperature ranges include the range of 350° F. to 500° F. Other exemplary residence time ranges include the range of 5 minutes to 50 minutes or the range of 10 minutes to 40 minutes. Other exemplary pressure ranges include the range of 15 psia to 150 psia.

The crude oil may be treated to remove the unstable sulfur molecules at any time during the production, transportation, handling or otherwise processing of the crude oil. In embodiments, the treatment zone may be situated at the wellhead or its associated production facility from where the crude oil is produced from the petroleum resource. Crude oil thus treated is more safely sent to tankage, loaded into a vessel for overland and/or sea transport or sent by pipeline.

In embodiments, the treatment zone is situated at a loading facility, for loading the crude oil into a vessel for transport, via ship, barge, train, truck or the like. In some such embodiments, it is desirable to minimally heat the crude oil, while optionally using a catalyst, and to select an appropriate stripping fluid rate and residence time to effect a desired removal of unstable sulfur compounds from the crude oil at a relatively low temperature. One effect of minimally heating the crude oil is the low cooling required before the treated crude oil is loaded for transport. In some such embodiments, the crude oil is heated to a temperature in the range of 100° F. to 300° F. during the sulfur treatment.

In embodiments, the treatment zone may be integrated into a refinery. In some such embodiments, the crude passes from the sulfur removal treatment zone directly and without substantial cooling into a crude unit for distillation separation of the crude oil into its component streams. For this application, the crude oil may be heated to temperatures up 800° F. within the treatment zone. Stripping fluid selection and rate, and the optional use of a catalytic material is selected to accommodate the elevated temperature. This integrated process has a feature of reduced equipment and energy requirements over a stand-alone treatment zone. In some embodiments, the crude oil is reacted in the treatment zone at a temperature in the range of 100° F. to 600° F. for a time sufficient to remove at least a portion of the unstable sulfur compounds. The converted crude oil is then further heated to distillation temperature in a following heating zone, and from there passed to the atmospheric crude column. The crude oil which is treated to remove unstable sulfur compounds in a process unit which is integrated with the refinery may be passed through a desalting unit for removing water and inorganic products from the crude prior to the treatment zone.

In embodiments, the process for removing the unstable sulfur compounds from crude oil may be conducted in the absence of added hydrogen. While hydrogen may be used as at least one of the components of a stripping fluid, and while hydrogen or a hydrogen containing gas may be used to blanket the crude oil during a heating step, a reaction step and/or a separation step, the use of hydrogen, alone or in combination with one or more other gases, is not required.

In embodiments, aqueous solutions containing sulfur-containing compounds, such as ammonium sulfide or sodium thiosulfate, may be added to the treatment zone for contacting with the crude oil to remove the unstable sulfur compounds contained therein. The resulting solution containing an increased amount of sulfide and elemental sulfur is as follows:

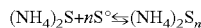

$$(NH_4)_2S + nS° \leftrightharpoons (NH_4)_2S_n$$

where n is a value in the range of 1 to 10. In embodiments, the resulting $(NH_4)_2S_n$ product is removed from the treatment zone and treated to recover the ammonium sulfide reactant.

The heating zone provides heat energy to increase and/or maintain the temperature of the crude oil. The heating zone may be any device suitable for heating a liquid to an elevated temperature, such as boilers, heat exchangers, furnaces and process heaters, electrical heaters, gas fired heaters, oil fired heaters, coal fired heaters and the like. In another embodiment, the heating zone may be integrated into other heating operations, such as within a refinery. In embodiments, the heating zone is a pipe or conduit through which the crude oil is transmitted. The pipe or conduit comprises a heating section, and optionally a reaction section after the heating section. The treatment zone will be of sufficient dimensions to permit a desired amount of sulfur removal from the crude.

The crude oil may further be contacted with a stripping fluid within the treatment zone to facilitate the removal of volatile sulfur species contained therein. Any gas phase material that does not detrimentally change the crude oil during the separation process may be used as a stripping fluid. Suitable gas streams to be used in stripping out the volatile sulfur compounds include, but are not necessarily limited to, natural gas, methane, ethane, propane, butane, pentane and heavier hydrocarbons, nitrogen, carbon dioxide, argon, helium, hydrogen, carbon monoxide and combinations thereof. In embodiments, the stripping fluid comprises a gas-phase material selected from the group consisting of natural gas, a hydrocarbonaceous gas, nitrogen and mixtures thereof. In embodiments, the stripping fluid comprises methane or mixtures of methane, ethane, and small amounts of propanes, butanes and yet smaller amounts of heavier hydrocarbons, in various non-limiting mixtures. In embodiments, the stripping fluid is a process gases. Typical process gases are generated during petroleum processing, and comprise gas mixtures containing at least one of methane, ethane, propanes and butanes in various compositional ratios, with optionally smaller amounts of heavier hydrocarbons.

The gas phase material is provided to the treatment zone at or above the pressure of the crude oil in the treatment zone, and at ambient temperatures or above. In embodiments, the gas phase material may be introduced into treatment zone at a temperature which is lower than, higher than or equal to the temperature of the crude oil entering the zone. In some such embodiments, the gas phase material is provided to the treatment zone at a temperature in the range of 100° F. to 450° F. In other embodiments, the gas phase material is provided to the treatment zone at a temperature in the range of 350° F. to 600° F., or in the range of 600° F. to 800° F. The gas phase material is provided to the treatment zone at a linear velocity and a rate to facilitate the removal of at least 50% of the volatile sulfur compounds from the crude oil.

In embodiments, the gas phase material may be added to the crude as the crude enters the treatment zone, it may be added as the crude passes through the treatment zone, or it may be added as the crude leaves the treatment zone. The stripping fluid is provided to the crude oil through gas distributors known for this purpose. Non-limiting examples include a gas injection port, at least one sieve tray or at least one bubble tray over which the crude oil passes.

In embodiments, the process and system described herein for removing the unstable sulfur compounds from the crude oil have an absence of added caustic alkali compounds (e.g. alkali metal hydroxides such as NaOH). There is also an absence of added amine compounds, oxidation agents and organic reducing agents, such as hydrazine, oximes, hydroxylamines, carbohydrazide and erythorbic acid.

The treatment zone may further contain one or more catalytically active materials for facilitating the removal of unstable sulfur compounds from the crude oil by reaction of the unstable sulfur compounds to volatile sulfur species, including the conversion of unstable sulfur compounds to $H_2S$. Particulate catalytic material may fill at least a portion of the treatment zone, or may be placed in trays within the treatment zone. In embodiments, the heated crude oil passes through the particulate catalyst trays, for conversion of the unstable sulfur compounds in the crude oil.

In embodiments, the treatment zone comprises a reaction zone for converting at least some of the unstable sulfur compounds in the crude oil and for removing at least some of the volatile sulfur compounds from the crude oil. It will be appreciated that the process will be considered successful even though all of the unstable sulfur compounds are not completely removed from the crude oil. The reaction zone may be integral to or separate from the heating zone. The reaction zone may include the capability for contacting the crude oil with a stripping fluid, the capability of contacting the crude oil with a catalyst or both. Under at least some operating conditions, the sulfur-removal process is facilitated by integrating the reaction zone and the separation zone into a single zone or vessel.

The reaction zone is generally a vessel in which a stripping fluid contacts the crude oil for purposes of removing at least a portion of the volatile sulfur species from the crude oil. The reaction process may be conducted in any vessel in which this contacting can occur, including a storage tank, a holding tank in a transportation vessel, a pipe through which the crude is passing, a distillation column, a reaction vessel, or a flash separator. The reaction vessel may comprise features to enhance the separation efficiency of the vessel.

Sweet stripping gas may be fed near the bottom of the treatment zone at a point below the crude oil feed and at a rate sufficient to provide a partial pressure of hydrogen sulfide to remove sufficient amounts of the unstable sulfur compounds to meet a specification based upon environmental specifications, shipping and transportation requirements, downstream operations such as refining or other uses. The stripping gas may be fed at the bottom end of the zone or other location near the bottom end of the zone. The stripping gas bubbles up through the falling crude oil. While the gas moves upward through the zone it may become enriched with $H_2S$ and other volatile sulfur containing materials and hydrocarbons. In embodiments, the treatment zone may comprise any vessel which facilitates the gas stripping, for example a spray tower, a distillation tower or a combination thereof. The crude oil may flow downward through the tower internals such as, for example, structured packing, random packing, sieve trays, valve trays, and/or disk and donut trays, or combinations thereof, becoming leaner in the content of unstable sulfur compounds. Meanwhile, the stripping gas becomes richer in $H_2S$ and other volatile sulfur compounds as it bubbles up the tower and exits the tower.

The rate at which the stripping fluid is added to the treatment zone is determined by a number of specific factors, including the viscosity and boiling range of the crude oil, the type of unstable sulfur compounds contained therein, the quantity of contained unstable sulfur compounds, the nature and composition of the stripping fluid, the temperature and pressure of the treatment zone, and the like. Nevertheless, in an embodiment for an acceptable operating range for the stripping fluid rate, the stripping rate may be about 0.1 to about 1.0 MSCF per barrel of crude oil (about 18 to about 180 $m^3/m^3$) or about 0.25 to about 0.5 MSCF per barrel of crude oil (44 to 89 $m^3/m^3$), or 0.3 to 0.4 MSCF per barrel of crude (53 to 71 $m^3/m^3$).

A sulfur-containing stripping fluid is generated from the sulfur removal process. The sulfur-containing stripping fluid may also contain varying amounts of light hydrocarbons from the crude oil, which are desirably recovered in a recovery unit such as a chilled vessel to condense the hydrocarbons, a mist screen to remove hydrocarbon mist droplets from the sulfur-containing stripping fluid or a knock-out pot to separate liquids from the sulfur-containing stripping fluid. Recovering the hydrocarbons from the sulfur-containing stripping fluid may be suitably handled either within or outside and downstream of the treatment zone.

The treatment zone may further contain one or more catalytic materials for facilitating the conversion of unstable sulfur compounds to volatile sulfur species, including the conversion of unstable sulfur compounds to $H_2S$. Catalytic materials known to enhance the removal of the sulfur compounds generally reduce the temperature at which the sulfur compounds are usefully removed from the crude. Materials such as inorganic or organic acids, particulate molecular sieves, dissolved metal ions, metal-containing slurry in an organic or aqueous fluid or a particulate catalyst comprising a metal component on an inorganic oxide matrix are suitable as catalytic materials for removing unstable sulfur compounds from crude oil.

In embodiments, acids which are useful for the present process include protic acids, ionic materials with Lewis acid properties, and inorganic materials with acidic properties.

Among the protic acids, inorganic and organic acids may be used for the sulfur removal process. Inorganic acids, or catalytic materials comprising inorganic acids, such as phosphoric acid and sulfuric acid are particularly beneficial. Hydrochloric acid will also remove sulfur, but a chlorine-containing acid is less desirable on account of possible deleterious metallurgical effects. Catalytic materials containing Lewis acids are also useful for removing the sulfur compounds. Suitable Lewis acids including metals in ionic form such $Fe^{3+}$, $Zn^{2+}$, $Co^{3+}$, $Ni^{2+}$ may be used as a catalytic material. Molecular sieves, including mordenite and zeolite Y, either in hydrogen form and/or containing metal ions are useful in the sulfur removal process. The metal ions may be incorporated into the molecular sieve during synthesis of the sieve, by ion exchange or by impregnation of the molecular sieve. Methods for incorporating metallic species into the molecular sieve are well known. Amorphous inorganic oxide materials, such as silica, alumina, magnesia, titania, and mixtures thereof, may also be used. Metals, such as $Fe^{3+}$, $Zn^{2+}$, $Co^{3+}$, $Ni^{2+}$, which are incorporated into the inorganic oxide material, either during preparation of the material or by impregnation, also show catalytic activity for the conversion of unstable sulfur species. These catalysts lower the operating temperature of pretreatment process, and at the same time keep good thermal and chemical stability during the catalytic process.

The catalyst may be blended into the crude as a dissolved component or as a slurry. The dissolved component may be added to the crude as either an aqueous phase material or an organic phase material. Use of an aqueous phase material is generally monitored to prevent excess water being added to the crude, since water in the presence of $H_2S$ produces a highly corrosive acid.

When added as a slurry, the catalytic material may be in the form of an organometallic complex or an ionic species. Example catalysts added in this way include the sulfates, nitrates, chlorides, acetates and sulfides of the metals in ionic form. The metals may further be associated with finely divided support materials, such as alumina, silica or aluminosilicates.

In embodiments, the crude oil is contacted within the treatment zone with at least one material known to have catalytic activity for the conversion of unstable sulfur compounds. The catalyst may be introduced into the crude oil before the crude oil is introduced to the treatment zone. In embodiments, the catalyst is added to the crude oil as a dissolved material in a separate liquid phase, as a suspension in a separate liquid phase or in powder or granular form added directly to the crude oil. The separate liquid phase may be an aqueous fluid or an organic fluid. In embodiments, the separate liquid phase liquid, which contains the catalyst material, is added to the crude in a ratio of up to 5 wt % of the crude oil. The separate liquid phase may comprise up to 10 wt % catalytic material. Non-limiting examples include up to 10 wt % $FeCl_3$ dissolved in an aqueous fluid for addition to the crude. Non-soluble materials may be added to the crude as a slurry. The slurry may have either an aqueous or an organic continuous phase.

In embodiments, the catalyst is present as a particulate catalyst. The particulate catalyst may be in the form of granules having uniform or non-uniform shapes, including spheres, extrudates and other shaped materials, but other shapes are also within the scope of the particulate catalyst. The granules are generally sized to have an average cross-sectional dimension of greater than 100 μm. In embodiments, the granules have an average cross-sectional dimension of greater than 1/32 inch, or an average cross-sectional dimension of Greater than 1/16 inch.

When present in the treatment zone, the particulate catalyst may be situated such that the crude oil passing through the treatment zone passes over the catalyst contained therein. The particulate catalyst may be present in a fixed bed, a fluidized bed, a moving bed and the like. The particulate catalyst may be present in a single bed in the zone, or it may be present in multiple beds, each in a separate vessel, or in separate layers in a single vessel, separated by, for example, a tray which supports each bed. When a catalyst which is selected to remove the unstable sulfur from the crude is located in a fixed bed reactor, the crude may pass downward through the catalyst bed, or it may flow upward through the catalyst bed.

Each catalyst bed may comprise a single type of catalyst, or a mixture of different catalysts. In a reaction zone containing multiple catalyst beds, the catalysts may vary from bed to bed in any order or configuration.

In embodiments, when at least one catalyst is present in the reaction zone, the reaction zone is maintained at a temperature in the region of 100° F. to 450° F. The temperature may be selected to result in a certain level of sulfur removal from the catalyst. In embodiments, the crude oil is maintained at a temperature in the range of 100° F. to 450° F. and at a pressure of 15 psia and above in the reaction zone. In some such embodiments, the crude oil is maintained at a temperature in the range of 100° F. to 450° F. and at a pressure in the range of 15 psia to 200 psia for a time period in the range of 1 minute to 60 minutes. An exemplary operating pressure is in the range of 15 psia to 100 psia. Exemplary residence time ranges include 5 to 40 minutes and 10 to 30 minutes.

In embodiments, the crude oil with reduced unstable sulfur content (e.g. desulfurized crude oil) is passed from the treatment zone to a distillation column for separating the crude oil into its vapor phase and liquid phase components. An exemplary distillation column includes an atmospheric column, an atmospheric crude column, a vacuum column or a vacuum crude column. In embodiments, the treated crude oil is transported via ship, rail, barge, pipeline, truck or similar conveyance prior to being passed to a distillation column. In embodiments, the crude oil is heated in the treatment zone to crude distillation temperatures, such as a temperature in the range of 600° F. to 800° F. The crude oil heated to this temperature is very reactive in the presence of a catalyst, and the residence time within the treatment zone is significantly reduced.

FIG. 1 illustrates an embodiment of the invention, including a crude oil 5 passing through heating zone 10 for heating to reaction temperature. The heated crude oil 12 exiting the heating zone 10 at a temperature in the range of 350° F. to 600° F. passes to the reaction zone 20, where at least a portion of the unstable sulfur compounds are converted to volatile sulfur compounds, including $H_2S$. The reaction zone 20 is at least partially filled with packing material 25 which has little or no catalytic activity for the conversion of the unstable sulfur compounds. The temperature in the reaction zone is sufficiently high to convert at least a portion of the unstable sulfur compounds in the heated crude oil 12. A stripping gas 14 is introduced to reaction zone 20, and at least a portion of a sulfur-containing stripping gas 16 is removed from the reaction zone. A crude oil with reduced sulfur content is recovered through stream 18.

FIG. 2 illustrates another embodiment of the invention. In FIG. 2, the catalytic material is containing within the reaction zone on catalyst support trays. FIG. 2 illustrates a crude oil 105 passing through heating zone 110 for heating to reaction temperature. The heated crude oil 112 exiting the heating zone 110 at a temperature in the range of 100° F. to 450° F. passes to the reaction zone 120 through crude oil inlet 122, where at least a portion of the unstable sulfur compounds are converted to volatile sulfur compounds, including $H_2S$. The reaction zone 120 contains catalyst support trays 125 on which a catalytic material is distributed for contacting the crude oil passing therethrough. A stripping gas 114 is introduced to reaction zone 120 through fluid inlet 124, and at least a portion of an sulfur-containing stripping gas 116 is removed from the reaction zone. A crude oil with reduced sulfur content is recovered through stream 118.

Example 1

Eocene crude is a Middle East crude having an API gravity of 18° and a total sulfur content of 4.5 wt %.

The quantity of unstable sulfur compounds in a sample of Eocene crude oil was determined as follows. 100 g Eocene crude oil sample was charged to a flask equipped with an overhead condenser. A nitrogen stripping gas at a constant 50 cc/min was bubbled through the crude oil in the flask, which was quickly heated to and then maintained at 500° F. Gaseous reaction products from the crude oil (principally hydrogen sulfide and light mercaptans) were passed through the overhead condenser to condense most of the light hydrocarbons and return them to the flask. The nitrogen gas containing the sulfur compounds was then passed through a NaOH scrubber to remove at least most of the sulfur compounds. The nitrogen gas was then vented.

During the test, gas samples before the NaOH scrubber were sampled and tested in a Draeger's tube and confirmed in a gas chromatographic column equipped with a sulfur chemiluminescence detector. It was found that most of the gaseous sulfur compounds were released from the crude oil in the first 30 minutes; at times greater than 30 minutes, the amount of sulfur released to the nitrogen gas decreased dramatically. After 3 hours, the measured sulfur concentration in the nitrogen stream was lower than 1000 ppm.

To determine the amount of unstable sulfur, total sulfur contents in the crude oil before and after the treatment were analyzed by the Leco sulfur method using a Leco SC-32 Sulfur Analyzer. Since only the unstable sulfur was released from the treatment, the total sulfur content difference between the original and the treated crude oil gave the unstable sulfur content in this crude oil, which was calculated to be about 0.5 wt % of the total crude oil. That accounts for ~11% of total sulfur in the untreated crude oil.

Example 2

Example 1 was repeated with a typical heavy crude oil other than Eocene crude, containing 3.8 wt % of total sulfur. No significant $H_2S$ was detected in the $N_2$ effluent stream and the total unstable sulfur in the crude was determined to be less than 0.005 wt % of the crude oil. Thus, it was determined that this heavy crude oil contained little or no unstable sulfur.

Example 3

Brönsted acids, including solid HY zeolite, acetic acid and phosphoric acid, were tested for their effectiveness as catalytic materials for removing unstable sulfur compounds from crude oil. Each catalytic material in turn was combined with 500 ml Eocene crude oil in a 1-liter autoclave. The oil and catalyst mixture was heated under continuous stirring and a N2 stripping rate of 150 cc/min, at a constant operating temperature of 300° F. The operating pressure for the test was 100 psig, to keep light hydrocarbon in the oil in liquid form. The outlet gas stream was sampled and its $H_2S$ concentration was measure using a GC equipped with a sulfur chemiluminescence detector.

At 300° F., both HY Zeolites and $H_3PO$ showed a higher activity for producing $H_2S$ than did the control test without catalyst and also showed a higher activity for producing $H_2S$ than did acetic acid. The data in Table 1 shows that the effectiveness of the catalytic material for removing the unstable sulfur compounds depends on the concentration and the acidity of the acid catalyst.

TABLE 1

| | Quantity of catalyst | Peak $H_2S$ concentration (T = 300° F.) |
|---|---|---|
| Control: without catalyst | | 4,000 ppm |
| Zeolite (HY): Si/Al weight ratio = 60 | 4 wt % | 55,000 ppm |

TABLE 1-continued

| | Quantity of catalyst | Peak H$_2$S concentration (T = 300° F.) |
|---|---|---|
| CH$_3$COOH | 10 wt % | 5,000 ppm |
| H$_3$PO$_4$: 85% concentration | 10 wt % | 14,000 ppm |

Example 4

Example 2 was repeated using powdered FeCl$_3$ as a typical Lewis acid salt at 200° F. Table 2 shows that FeCl$_3$ was particularly effective at removing unstable sulfur compounds from crude oil.

TABLE 2

| | Quantity of catalyst | Peak H$_2$S concentration (T = 200° F.) |
|---|---|---|
| Control: without catalyst | | 75 ppm |
| FeCl$_3$ | 4 wt % | 30,000 ppm |

Example 5

Example 2 was repeated with a catalytic material comprising Fe (III) ion exchanged onto a Y zeolite. As shown in Table 3, the supported metal ion showed considerable catalytic effects at 300° F.

TABLE 3

| | Quantity of catalyst | Peak H$_2$S concentration (T = 300° F.) |
|---|---|---|
| Control: without catalyst | | 4,000 ppm |
| Zeolite (HY): Si/Al weight ratio = 60 | 4 wt % | 55,000 ppm |
| Fe3+-Y zeolite | 4 wt % | 17,000 ppm |

What is claimed is:

1. A system for reducing a sulfur content of a crude oil, including:
   a. a catalytic material comprising a metallic species selected from the group consisting of Fe$^{3+}$, Zn$^{2+}$, Co$^{3+}$, and Ni$^{2+}$;
   b. a heating zone configured for heating the crude oil in the absence of added hydrogen;
   c. a stripping fluid, configured for contacting the heated crude oil at a temperature in a temperature range of 100° F. to 450° F., a pressure in a pressure range of 15 psia to 200 psia, and in the presence of the catalytic material; and
   d. a treatment zone comprising a fluid inlet configured for passing the stripping fluid into the treatment zone, a crude oil inlet configured for passing the heated crude oil into the treatment zone, and a bed of the catalytic material positioned within the treatment zone such that the heated crude oil and the stripping fluid are together contacted within the bed of the catalytic material;
   wherein the stripping fluid comprises a gas-phase material selected from the group consisting of the natural gas, a methane, an ethane, a propane, a butane, a pentane and heavier hydrocarbons, a nitrogen, a carbon dioxide, an argon, a helium, a carbon monoxide and combinations thereof.

2. The system of claim 1, wherein the heating zone comprises a temperature in the temperature range of 100° F. to 450° F. and a pressure in the pressure range of 15 psia to 200 psia.

3. The system of claim 2, wherein the crude oil is in the heating zone for a time period in a time range of 1 minute to 60 minutes.

4. The system of claim 2, wherein the crude oil contains at least 0.1 wt % unstable sulfur compounds prior to heating, and wherein at least 50% of the unstable sulfur compounds are converted into volatile sulfur compounds upon heating.

5. The system of claim 4, wherein the unstable sulfur compounds comprise polysulfanes and polysulfides.

6. The system of claim 4, wherein the unstable sulfur compounds comprise a sulfur compound having a generic formula Sx, wherein x is a value from 1 to 10.

7. The system of claim 4, wherein the volatile sulfur compounds comprise H2S, low molecular weight mercaptans, carbon disulfide, carbonyl sulfide, and mixtures thereof.

8. The system of claim 4, wherein the volatile sulfur compounds are removed in the treatment zone.

9. The system of claim 8, wherein the crude oil is reduced in the sulfur content in the absence of added caustic alkali compounds, amine compounds, oxidation agents and organic reducing agents.

10. The system of claim 1, wherein a desulfurized crude oil and a sulfur containing stripping gas are recovered from the treatment zone.

11. The system of claim 1, further comprising an atmospheric distillation column, wherein a desulfurized crude oil is passed through the distillation column.

12. The system of claim 1, further comprising contacting the crude oil with at least one aqueous solution containing at least one sulfur-containing compound selected from the group consisting of ammonium sulfide and sodium thiosulfate and recovering a solution containing an increased amount of sulfur.

13. The system of claim 1, wherein the catalytic material is selected from the group consisting of inorganic acids or organic acids, particulate molecular sieves, dissolved metal ions, metal-containing slurry in an organic or aqueous fluid and a particulate catalyst comprising a metal component on an inorganic oxide matrix.

14. The system of claim 1, wherein the catalytic material comprises an inorganic oxide selected from the group consisting of Y zeolites, silica, alumina, silica alumina and mixtures thereof.

15. The system of claim 1, wherein the catalytic material comprises an inorganic acid selected from the group consisting of phosphoric acid and sulfuric acid.

16. The system of claim 1, wherein the catalytic material is maintained as a fixed particulate bed.

17. The system of claim 1, wherein the stripping fluid comprises the gas-phase material selected from the group consisting of the natural gas, the nitrogen, and the combinations thereof.

18. The system of claim 1, wherein the stripping fluid comprises the nitrogen.

* * * * *